United States Patent
Hundley

(10) Patent No.: US 10,740,307 B2
(45) Date of Patent: Aug. 11, 2020

(54) SELF ORGANIZING LIST MACHINE FOR REORDERING ITEMS OF A LIST

(71) Applicant: Teradata US, Inc., Dayton, OH (US)

(72) Inventor: Douglas Edward Hundley, Poway, CA (US)

(73) Assignee: Teradata US, Inc., San Diego, CA (US)

( * ) Notice: Subject to any disclaimer, the term of this patent is extended or adjusted under 35 U.S.C. 154(b) by 864 days.

(21) Appl. No.: 15/059,719

(22) Filed: Mar. 3, 2016

(65) Prior Publication Data

US 2017/0193129 A1 Jul. 6, 2017

Related U.S. Application Data

(60) Provisional application No. 62/273,824, filed on Dec. 31, 2015.

(51) Int. Cl.
*G06F 16/22* (2019.01)

(52) U.S. Cl.
CPC .............................. *G06F 16/2228* (2019.01)

(58) Field of Classification Search
CPC .................................................. G06F 16/2228
See application file for complete search history.

(56) References Cited

U.S. PATENT DOCUMENTS

| | | | | |
|---|---|---|---|---|
| 5,717,394 A | * | 2/1998 | Schwartz | H03M 7/4006 341/107 |
| 6,438,641 B1 | * | 8/2002 | Kanno | G06F 12/0607 711/202 |
| 7,154,416 B1 | * | 12/2006 | Savage | H03M 7/30 341/51 |
| 2003/0009655 A1 | * | 1/2003 | Blaner | G06F 9/4403 713/1 |
| 2004/0073550 A1 | * | 4/2004 | Meirovitz | G06F 16/90344 |
| 2006/0290538 A1 | * | 12/2006 | Kravtsounov | H03M 7/4006 341/50 |
| 2008/0104374 A1 | * | 5/2008 | Mohamed | G06F 7/24 712/220 |

\* cited by examiner

*Primary Examiner* — Matthew J Ellis
(74) *Attorney, Agent, or Firm* — Michael Chan

(57) ABSTRACT

A self-organizing list machine is provided for reordering items of a list in a manner that achieves both a constant and minimum time complexity. The self-organizing list machine comprises an array of symbol index generators, wherein (i) each symbol index generator has a unique location in the array between zero and N−1 inclusive, and (ii) N is the total number of unique symbols in a symbol alphabet.

20 Claims, 3 Drawing Sheets

FIG. 2

| Initial | "F" In 5 Out | List Update | "A" In 1 Out | List Update | "B" In 2 Out | List Update | "C" In 2 Out | List Update | "D" In 4 Out | List Update |
|---|---|---|---|---|---|---|---|---|---|---|
| PID=0 SID=A Index=0 | PID=0 SID=A Index=0 | PID=0 SID=A Index=1 | PID=0 SID=A Index=1 | PID=0 SID=A Index=0 | PID=0 SID=A Index=0 | PID=0 SID=A Index=1 | PID=0 SID=A Index=1 | PID=0 SID=A Index=2 | PID=0 SID=A Index=2 | PID=0 SID=A Index=3 |
| PID=1 SID=B Index=1 | PID=1 SID=B Index=1 | PID=1 SID=B Index=2 | PID=1 SID=B Index=2 | PID=1 SID=B Index=2 | PID=1 SID=B Index=2 | PID=1 SID=B Index=0 | PID=1 SID=B Index=0 | PID=1 SID=B Index=1 | PID=1 SID=B Index=1 | PID=1 SID=B Index=2 |
| PID=2 SID=C Index=2 | PID=2 SID=C Index=2 | PID=2 SID=C Index=3 | PID=2 SID=C Index=3 | PID=2 SID=C Index=3 | PID=2 SID=C Index=3 | PID=2 SID=C Index=3 | PID=2 SID=C Index=0 | PID=2 SID=C Index=0 | PID=2 SID=C Index=0 | PID=2 SID=C Index=1 |
| PID=3 SID=D Index=3 | PID=3 SID=D Index=3 | PID=3 SID=D Index=4 | PID=3 SID=D Index=4 | PID=3 SID=D Index=4 | PID=3 SID=D Index=4 | PID=3 SID=D Index=4 | PID=3 SID=D Index=3 | PID=3 SID=D Index=4 | PID=3 SID=D Index=4 | PID=3 SID=D Index=0 |
| PID=4 SID=E Index=4 | PID=4 SID=E Index=4 | PID=4 SID=E Index=5 | PID=4 SID=E Index=5 | PID=4 SID=E Index=5 | PID=4 SID=E Index=5 | PID=4 SID=E Index=5 | PID=4 SID=E Index=4 | PID=4 SID=E Index=5 | PID=4 SID=E Index=5 | PID=4 SID=E Index=5 |
| PID=5 SID=F Index=5 | PID=5 SID=F Index=5 | PID=5 SID=F Index=0 | PID=5 SID=F Index=0 | PID=5 SID=F Index=1 | PID=5 SID=F Index=1 | PID=5 SID=F Index=2 | PID=5 SID=F Index=2 | PID=5 SID=F Index=3 | PID=5 SID=F Index=3 | PID=5 SID=F Index=4 |

FIG. 3

SELF ORGANIZING LIST MACHINE FOR REORDERING ITEMS OF A LIST

CROSS REFERENCE TO RELATED APPLICATIONS

This application claims priority under 35 U.S.C. § 119(e) to the following commonly-assigned patent application, which is incorporated herein by reference:

Provisional Patent Application Ser. No. 62/273,824, entitled "SELF-ORGANIZING LIST MACHINE FOR REORDERING ITEMS OF A LIST," filed on Dec. 31, 2015, by Douglas Edward Hundley.

TECHNICAL FIELD

The present disclosure relates to self-organizing lists, and is particularly directed to a self-organizing list machine for reordering items of a list.

BACKGROUND

A self-organizing list is a list that reorders its items based on some self-organizing heuristic. A self-organizing list has many applications in computer science. One application is to reduce the average search time of a linear search by moving frequently accessed items nearer to the front of the list. Compilers may use self-organizing lists for their symbol tables. Caching algorithms may use self-organizing lists to determine which items to replace when a central processing unit (CPU) accesses a memory location that is not currently resident in a cache. Another application is to compress data. If input data contains symbols with a high local correlation of frequencies, then the entropy of a message can be reduced by transmitting an index value of the list item containing the symbol rather than the symbol itself. By doing this, and then reorganizing the list according to a self-organizing heuristic, the index values output from the list will tend to be low in numerical value. This enables a subsequent stage such as an entropy encoder (e.g., a Huffman encoder or a range coder) to achieve higher compression results.

There are many self-organizing heuristics in use. Some of the more popular ones include:
  Move-To-Front (MTF): When an item is accessed, that item is moved to the front of the list. The list is rearranged such that all other items remain in the same relative order.
  Move-One-From-Front (M1FF)—When an item is accessed, it is moved one position from the front of the list unless it is the second item in the list. In that case, it is moved to the front.
  Transpose: When an item is accessed, that item is swapped with the item one position closer to the front of the list.
  Best x of 2x−1: Given any two symbols in the list, the symbol that was requested "x" or more times in the previous "2x−1" requests for either symbol is in front. Move-To-Front can be described as "Best 1 of 1".
  Timestamp: This is "Best 2 of 3" which is a specific form of "Best x of 2x−1".

The performance of accessing and maintaining a self-organizing list varies widely. The best case access time is "1" when the item being accessed is at the front of the list. The worst case access time is "n", where n is the number of items in the list. The average case access time can be shown to be:

$$T_{avg}=1*p(1)+2*p(2)+3*p(3)+4*p(4) \ldots +n*p(n)$$

where p(i) is the probability of accessing the $i^{th}$ element in the list.

The performance of a self-organizing list is data-dependent and unpredictable. Known techniques attempt to reduce the average case access time. An example technique is to initialize the list in the order of diminishing probabilities. However, a drawback in this known technique is that in many cases the probabilities are unknown at initialization. Accordingly, it is not possible to determine the optimal initialization sequence. Another drawback with this initialization technique as well as other known techniques is that all of the techniques have the same worst case access time.

SUMMARY

A disclosed embodiment provides a self-organizing list machine for reordering items of a list. The self-organizing list machine comprises an array of symbol index generators, wherein (i) each symbol index generator has a unique location in the array between zero and N−1 inclusive, and (ii) N is the total number of unique symbols in a symbol alphabet.

BRIEF DESCRIPTION OF THE DRAWINGS

Aspects of the present disclosure are best understood from the following detailed description when read with the accompanying figures, in which

FIG. 2 is a table of input values and output values associated with the self-organizing list machine of FIG. 1 if the machine uses a Move-To-Front self-organizing heuristic.

Figure 3:
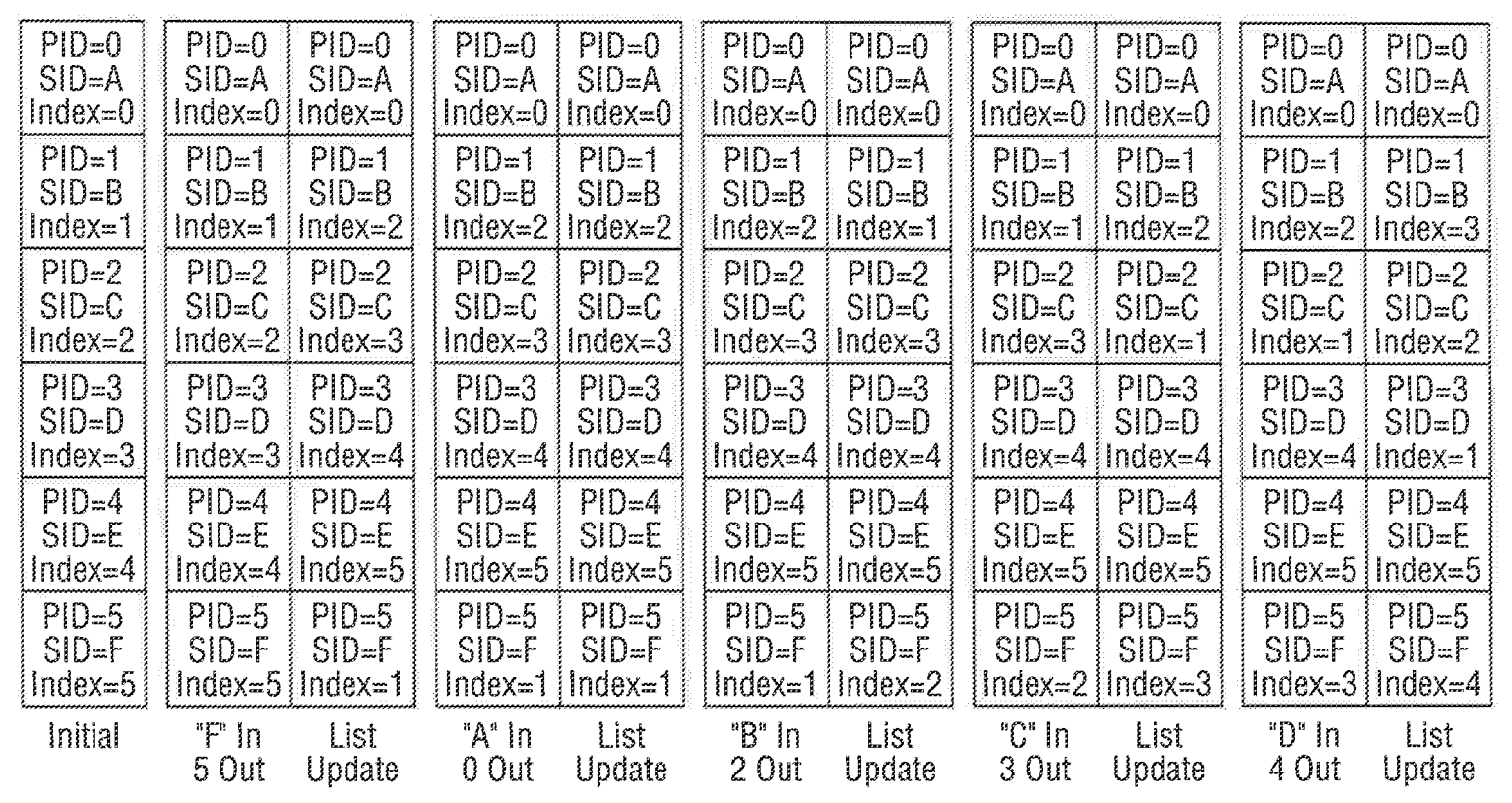

FIG. 3 is a table of input values and output values associated with the self-organizing list machine of FIG. 1 if the machine uses a Move-One-From-Front self-organizing heuristic.

DETAILED DESCRIPTION

Figure 1:
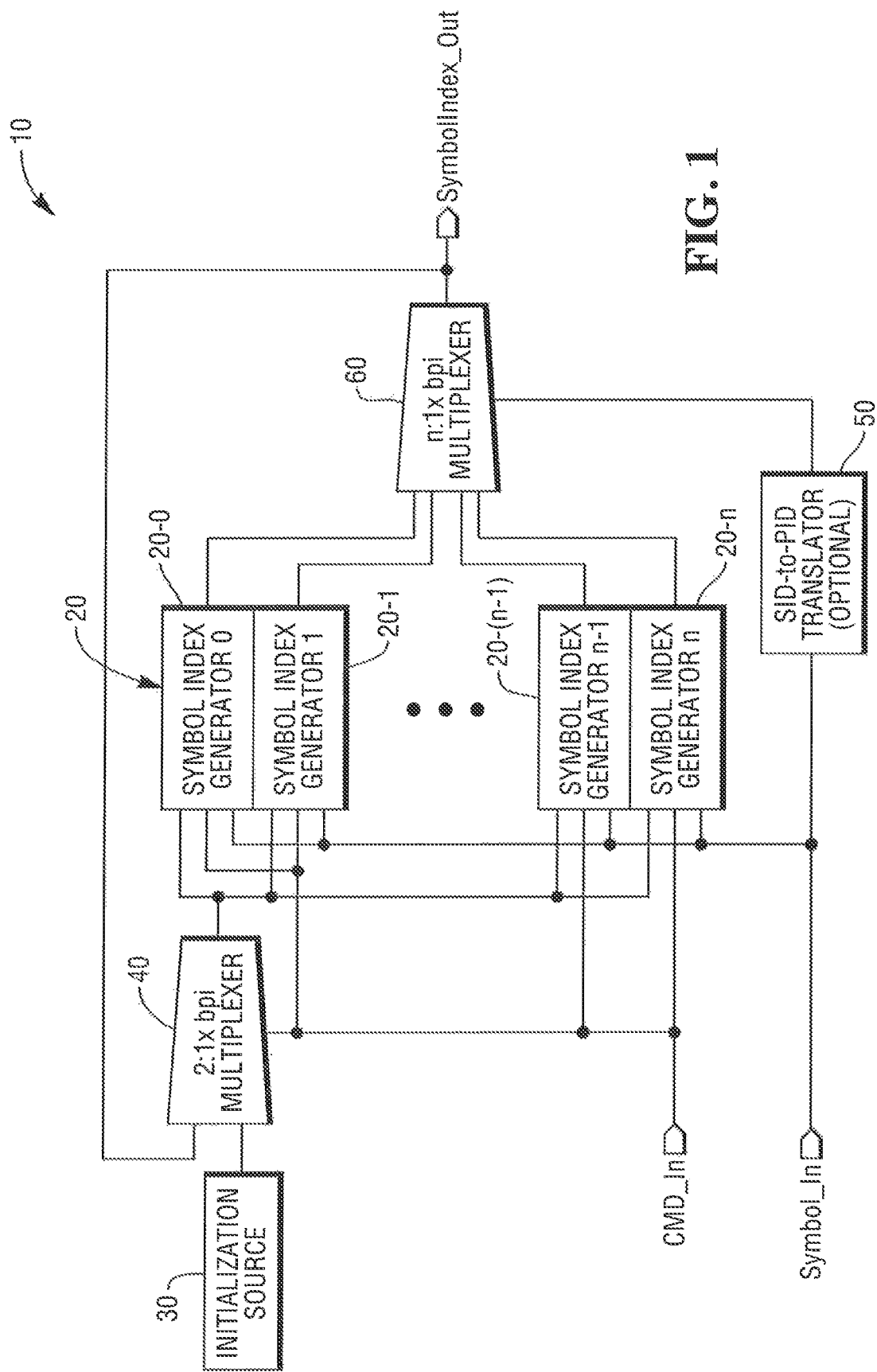
FIG. 1 is a block diagram representation of a self-organizing list machine constructed in accordance with an embodiment.

It is to be understood that the following disclosure provides many different embodiments or examples for implementing different features of various embodiments. In one embodiment, a self-organizing list machine may be implemented on a semiconductor platform such as a field-programmable gate array (FPGA). In another embodiment, a self-organizing list machine may be implemented on a semiconductor platform such as an application specific integrated circuit (ASIC), or any other customizable integrated circuit. Specific examples of components and arrangements are described below to simplify the present disclosure. These are, of course, merely examples and are not intended to be limiting.

In the implementation of a self-organizing list (SOL) machine 10 shown in the block diagram of FIG. 1, there is an array of Symbol Index Generators 20 (designated individually as 20-0, 20-1, . . . 20-*n*). Each of the Symbol Index Generators 20 has a specific and unique location in the array between 0 and n−1 inclusive, where n is the total number of symbols in a symbol alphabet. Each of the Symbol Index Generators 20 also has a Symbol ID (SID) that can be assigned during initialization or hardwired as required for the specific implementation. The SID corresponds to a specific and unique symbol value that is presented on Symbol_In input line during normal operation.

There is a one-to-one correspondence between Symbol Index Generator SIDs, and the number of possible unique symbols. For example, if there are 256 symbols in the symbol alphabet, a minimum of 256 Symbol Index Generators are required, each with a unique SID. Additional Symbol Index Generators can be present, but unused. The SID of each unused Symbol Index Generator does not match any possible value on Symbol_In input line.

Should the SOL machine 10 be reconfigured at a later time, each previously unused Symbol Index Generator can be assigned a SID, according to the needs of a new symbol alphabet. The symbol alphabet can be any length, and does not need to be a power of two. However, each symbol input to the Symbol Index Generators 20 must be a sufficient number of bits to ensure that there is no ambiguity in the value of the symbol.

Initialization of Symbol Index Generators:

Prior to a list update operation, each of the Symbol Index Generators 20 must be initialized. Initialization involves loading an initial index value into each of the Symbol Index Generators 20. Each of the Symbol Index Generators 20 must have a unique positional identity (PID), SID, and initial index value. The PID is fixed, unique, and cannot be changed during operation. Each one of the Symbol Index Generators is assigned a PID. There are many options for initialization.

One initialization method could be to program each of the Symbol Index Generators 20 via an external initialization source 30 like a random access memory (RAM), read-only memory (ROM), a counter, a microprocessor, or any other suitable external source. This might be beneficial if the high probability symbols are known in advance or if the incoming symbol data has been profiled such that a more optimal initial sequence can be used. A first multiplexer (MUX) 40 selects the external initialization source 30 via some command signal on CMD_In input line during initialization. The first MUX 40 is a 2:1 multiplexer. There are other initialization methods for selecting the external initialization source 30 that would not change the overall behavior of the SOL machine 10.

In one implementation, there could be more Symbol Index Generators than possible symbol values on Symbol_In input line, or (for some implementation specific reason) the Symbol Index Generator does not have a PID that matches the symbol value that it represents. In this case, a SID-to-PID Translator 50 is needed. When a SID-to-PID translation is made and presented on a select-line of a second MUX 60, the second MUX 60 passes the index value from the corresponding one of the Symbol Index Generators 20 to SymbolIndex_Out output line. The second MUX 60 is an "n:1" multiplexer, where "n" is the total number of symbols in the symbol alphabet, as already mentioned above.

In another implementation, the SID and the initial index value could be made to equal the PID. In other words, Symbol Index Generator 0 would have SID=0, and initial index value=0; Symbol Index Generator 1 would have SID=1, and initial index value=1, etc. When SID=PID, the SID-to-PID Translator 50 is not required. Accordingly, there is a one-to-one correspondence between the symbols and the SIDS, and the SID-to-PID Translator 50 is optional and could be omitted. For example, if the symbol value on Symbol_In input line is presented on a 4-bit signal, and there are 16 SIDS (i.e., $2^4$), the SOL machine 10 could be designed such that the Symbol Index Generator with PID=0000 would be selected when the Symbol_In value='0000', Symbol Index Generator with PID='0001' is selected when Symbol_In value='0001', etc.

List Update Operation Step One:

Once the SOL machine 10 is initialized, it can begin a list update operation. During step one of a list update operation, a symbol value is placed on Symbol_In input line, and a command signal is placed on CMD_In input line. The symbol value selects one of the Symbol Index Generators 20. More specifically, each of the Symbol Index Generators 20 decodes the symbol value on Symbol_In input line to determine if it is the selected Symbol Index Generator. The output of the selected Symbol Index Generator is thereby selected via the first MUX 40. Accordingly, the output of the current index value of the selected Symbol Index Generator is placed on SymbolIndex_Out output line. The signal on SymbolIndex_Out output line is fed back to each of the Symbol Index Generators 20 via the first MUX 40.

In another implementation, the symbol value on Symbol_In input line could be decoded externally to select the active Symbol Index Generator. This is an implementer's choice and has no impact on the function of the SOL machine 10. It is also the implementer's choice to use an n:1 multiplexer or some other technique to output the index value of the selected Symbol Index Generator. In the first step of the list update operation, the symbol value is input to the SOL machine 10 via Symbol_In input line, and the index value associated with that symbol value is output on SymbolIndex_Out output line.

List Update Operation Step Two:

During step two of the list update operation, each of the Symbol Index Generators 20 responds to the current command signal on CMD_In input line and the current index value on SymbolIndex_Out output line to update its own internal index value. With all of the Symbol Index Generators 20 simultaneously updating their internal index storage elements, the entire list is updated in a single operation. The SOL machine 10 is then ready to repeat step one of the list update operation with the next input symbol value. To better understand how each of the Symbol Index Generators 20 updates its internal index storage element, a couple of examples are described hereinbelow using known self-organizing list heuristics.

Move-To-Front (MTF) Example:

Assume that the symbol alphabet consists of the symbols "A,B,C,D,E,F" and that the initialization sequence results in the initial conditions shown on the left of FIG. 2.

Now consider the input sequence of "FABCD". FIG. 2 shows the remaining states as these symbols are inputted, indexes are outputted, and the list is updated. Not shown but implied, the SID-to-PID Translator 50 is required to translate "A" into PID 0, "B" into PID 1, etc. When the command signal on CMD_In input line indicates "move-to-front", the logic in each of the Symbol Index Generators 20 behaves as described in the following pseudo-code:

| | |
|---|---|
| If (Symbol_In == MySID) | // if my symbol is selected |
|   MyIndex = 0 | // move to front at end of step 2 |
| Elsif (Index_In > MyIndex) | // if step 1 output index was behind me |
|   MyIndex = MyIndex+1 | // then move me down the list by 1 in step 2 |
| Endif | // else no change |

The end result of the SOL machine 10 using the MTF heuristic is an output sequence of 5,1,2,2,4.

Move-One-From-Front (M1FF) Example:

Assuming the same alphabet and the same input sequence described above for the MTF example, FIG. 3 depicts the sequential changes to the list using the M1FF heuristic.

When the command signal on CMD_In input line indicates "M1FF", the logic in each Symbol Index Generator behaves as described in the following pseudo-code:

```
If (Symbol_In==MySID)           // if my symbol is selected
    If ((MyIndex == 1            // and my symbol is at index 0 or 1
    OR (MyIndex == 0))
        MyIndex = 0              // then my index goes to 0
    Else
        MyIndex = 1              // else move my index one from front
    Endif
Elsif ((My_Index == 0)           //if my symbol is at front and the...
    AND (Index_In == 1))
    MyIndex = 1                  // new symbol is adjacent, then move
Elsif (Index_In > MyIndex)       // if my index is displaced
    MyIndex = MyIndex + 1        // then move down the list
Endif                            // else my symbol was not displaced
```

The end result of the SOL machine 10 using the M1FF heuristic is an output sequence of 5,0,2,3,4.

It should be apparent that the above-described implementation has at least one multiplexer operatively connected to an array of symbol index generators and co-operating with the array of symbol index generators to provide an output sequence of a self-organizing list machine. More specifically, a first multiplexer is operatively connected to the array of symbol index generators to select an external initialization source in response to a command signal during initialization of the self-organizing list machine, and a second multiplexer is operatively connected to the array of symbol index generators to pass through an index output value from a corresponding symbol index generator of the array of symbol index generators in response to a symbol input signal.

In the disclosed implementation, each symbol index generator is responsive to the command signal and the symbol input signal to provide an index output value that is applied to an input of the second multiplexer. Also, the index output value that has passed through the second multiplexer is fed back to an input of the first multiplexer. Optionally, a translator processes the symbol input signal before the second multiplexer is responsive thereto.

It should further be apparent that the list update operation of the above-described SOL machine 10 can be easily changed by changing the behavior of the Symbol Index Generators 20 with essentially no change in performance. Performance is essentially constant.

It should also be apparent that the above-described hardware-based approaches are user-definable and customizable to fit a particular environment. User-definable initialization methods provide a flexible and customizable solution for updating self-organizing lists. This is a significant enhancement when compared to known software-based approaches for updating self-organizing lists. Moreover, the hardware-based approaches allow a list to be initialized in any suitable manner. Hardware can be programmed to perform many self-organizing heuristics, including, but not limited to MTF and M1FF described in the above examples.

It should further be apparent that the above-described hardware-based approaches overcome drawbacks of known software-based approaches in updating self-organizing lists. The hardware-based approaches use an array of small processing elements that together resolve the erratic data-dependent performance of a self-organizing list when a software-based approach is used. The hardware-based approaches provide a self-organizing list with an essentially constant average case access time of "1".

It should also be apparent that the above hardware configurations provide hardware components that facilitate a new approach to creating a self-organizing list for use in computer science applications. It is conceivable that hardware components may be applied to facilitate the new approach to creating a self-organizing list for use in any type of system which is other than a computer system.

Although the above description describes use of the first MUX 40 shown in FIG. 1 for initialization, it is conceivable that the machine's initialization be hardwired or fixed (i.e., cannot be changed without rebuilding the machine). In such an implementation, the first MUX 40 would not be needed, and the feedback signal SymbolIndex_Out would be connected directly to the input of each of the Symbol Index Generators 20.

The above description depicts process serialization to facilitate an understanding of disclosed embodiments and is not necessarily indicative of serialization of operations being performed. In various embodiments, processing in each of the example pseudo-codes described above may be performed in varying order.

The illustrative hardware block diagram shown in FIG. 1 depicts blocks that may represent modules, electrical circuits, or portions of modules that include one or more electrical circuits. Although the particular examples illustrate specific hardware implementations, many alternative implementations are possible and may be made by simple design choice. The specific hardware implementation described herein is not limited to any particular embodiment. For example, any integrated-chip set, any FPGA arrangement, or any combination thereof, executing on any number of processors may be implemented.

Also, although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Many other embodiments are also within the scope of the following claims.

What is claimed is:

1. A hardwired self-organizing list machine for reordering items of a self-organizing list, the hardwired self-organizing list machine comprising: an array of symbol index generators, wherein (i) each symbol index generator has a unique location in the array from zero to N−1 inclusive, (ii) N is the total number of unique symbol values in a symbol alphabet, (iii) each symbol index generator has a symbol input line that receives a symbol input value, and (iv) each symbol index generator provides an output that is multiplexed with outputs of other symbol index generators to provide an index value on a symbol index output line that is indicative of position of the symbol input value as an item in the self-organizing list.

2. A hardwired self-organizing list machine according to claim 1, wherein each symbol index generator has a symbol identification (SID).

3. A hardwired self-organizing list machine according to claim 2, wherein each SID is assigned during initialization of the array of symbol index generators.

4. A hardwired self-organizing list machine according to claim 2, wherein each SID is hardwired as required for a specific implementation of the self-organizing list machine.

5. A hardwired self-organizing list machine according to claim 2, wherein there is a one-to-one correspondence between the SIDS and the unique symbol values in the symbol alphabet.

6. A hardwired self-organizing list machine according to claim 2, wherein each symbol index generator includes a command input line.

7. A hardwired self-organizing list machine according to claim 2, wherein each symbol index generator includes a command input line, and an initialization input line.

8. A hardwired self-organizing list machine for reordering items of a self-organizing list, the hardwired self-organizing list machine comprising: an array of symbol index generators, wherein (i) each symbol index generator has a unique location in the array from zero to N−1 inclusive, (ii) N is the total number of unique symbol values in a symbol alphabet, and (iii) each symbol index generator has a symbol input line that receives a symbol input value; and at least one multiplexer operatively connected to the array of symbol index generators and co-operating with the array of symbol index generators to provide an index value on a symbol index output line that is indicative of position of the symbol input value as an item in the self-organizing list.

9. A hardwired self-organizing list machine according to claim 8, wherein each symbol index generator has a symbol identification (SID).

10. A hardwired self-organizing list machine according to claim 9, wherein each SID is assigned during initialization of the array of symbol index generators.

11. A hardwired self-organizing list machine according to claim 9, wherein each SID is hardwired as required for a specific implementation of the self-organizing list machine.

12. A hardwired self-organizing list machine according to claim 9, wherein there is a one-to-one correspondence between the SIDS and the unique symbols in the symbol alphabet.

13. A hardwired self-organizing list machine according to claim 9, wherein each symbol index generator includes a command input line.

14. A hardwired self-organizing list machine according to claim 9, wherein each symbol index generator includes a command input line, and an initialization input line.

15. A hardwired self-organizing list machine for reordering items of a self-organizing list, the hardwired self-organizing list machine comprising: an array of symbol index generators, wherein (i) each symbol index generator has a unique location in the array from zero to N−1 inclusive, (ii) N is the total number of unique symbol values in a symbol alphabet, and (iii) each symbol index generator has a symbol input line that receives a symbol input signal; a first multiplexer operatively connected to the array of symbol index generators to select an external initialization source in response to a command signal during initialization of the self-organizing list machine; and a second multiplexer operatively connected to the array of symbol index generators to pass through an index output value from a corresponding symbol index generator of the array of symbol index generators in response to the symbol input signal, wherein the index output value is indicative of position of the symbol input signal as an item in the self-organizing list.

16. A hardwired self-organizing list machine according to claim 15, wherein each symbol index generator is responsive to the command signal to provide an index output value that is applied to an input of the second multiplexer.

17. A hardwired self-organizing list machine according to claim 15, wherein the index output value that has passed through the second multiplexer is fed back to an input of the first multiplexer.

18. A hardwired self-organizing list machine according to claim 15, further comprising:

a translator for processing the symbol input signal before the second multiplexer is responsive thereto.

19. A hardwired self-organizing list machine according to claim 15, wherein (i) each symbol index generator is responsive to the command signal and the symbol input signal to provide an index output value that is applied to an input of the second multiplexer, and (ii) the index output value that has passed through the second multiplexer is fed back to an input of the first multiplexer.

20. A hardwired self-organizing list machine according to claim 19, further comprising:

a translator for processing the symbol input signal before the second multiplexer is responsive thereto.

* * * * *